(12) United States Patent
Kataoka et al.

(10) Patent No.: US 9,781,812 B2
(45) Date of Patent: Oct. 3, 2017

(54) LIGHTING CONTROL DEVICE, LIGHTING SYSTEM, AND METHOD OF CONTROLLING LIGHTING DEVICE

(71) Applicant: Panasonic Intellectual Property Management Co., Ltd., Osaka (JP)

(72) Inventors: Hisao Kataoka, Osaka (JP); Katsuyoshi Deto, Osaka (JP); Tatsuya Sasago, Hyogo (JP); Teruyuki Kimata, Tokyo (JP); Haruka Miyagata, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/285,192

(22) Filed: Oct. 4, 2016

(65) Prior Publication Data

US 2017/0099716 A1 Apr. 6, 2017

(30) Foreign Application Priority Data

Oct. 6, 2015 (JP) .................................. 2015-198726

(51) Int. Cl.
*G06F 3/033* (2013.01)
*H05B 37/02* (2006.01)
*H05B 33/08* (2006.01)
*G06F 3/01* (2006.01)
*F21V 14/02* (2006.01)

(52) U.S. Cl.
CPC .......... *H05B 37/0227* (2013.01); *F21V 14/02* (2013.01); *G06F 3/011* (2013.01); *G06F 3/017* (2013.01); *H05B 33/0854* (2013.01); *H05B 33/0872* (2013.01); *H05B 37/0272* (2013.01)

(58) Field of Classification Search
CPC .......... G06F 3/017; G06F 3/011; F21V 14/02; H05B 37/0227
USPC .................................. 345/158; 382/103, 116
See application file for complete search history.

(56) References Cited

U.S. PATENT DOCUMENTS

2010/0277073 A1 11/2010 Van Endert
2010/0277074 A1* 11/2010 Van Endert ........ H05B 37/0227
  315/149
2013/0120238 A1 5/2013 Spaulding et al.

FOREIGN PATENT DOCUMENTS

| JP | 2008-016289 A | 1/2008 |
| JP | 2011-009066 A | 1/2011 |
| JP | 2011-501365 A | 1/2011 |
| JP | 2014-238959 A | 12/2014 |

(Continued)

*Primary Examiner* — Thuy Vinh Tran
(74) *Attorney, Agent, or Firm* — McDermott Will & Emery LLP

(57) ABSTRACT

A lighting control device includes: a sensor that detects a state of a user and a gesture made by the user; and a controller that controls a lighting characteristic of one or more lighting devices. In the lighting control device and in a method of controlling the lighting device, the sensor detects a first state and a second state of a hand of the user. In response to the sensor detecting the hand of the user in the first state aiming at one lighting device among the one or more lighting devices, the controller designates the one lighting device as a control target lighting device, and in response to the sensor detecting a predetermined gesture involving the hand in the second state, the controller controls a lighting characteristic of the control target lighting device.

14 Claims, 10 Drawing Sheets

(56) References Cited

FOREIGN PATENT DOCUMENTS

| | | |
|---|---|---|
| JP | 2014-535154 A | 12/2014 |
| WO | 2009052655 A1 | 4/2009 |
| WO | 2013071013 A1 | 5/2013 |

\* cited by examiner

LIGHTING CONTROL DEVICE, LIGHTING SYSTEM, AND METHOD OF CONTROLLING LIGHTING DEVICE

CROSS REFERENCE TO RELATED APPLICATION

This application claims the benefit of priority of Japanese Patent Application Number 2015-198726 filed on Oct. 6, 2015, the entire content of which is hereby incorporated by reference.

BACKGROUND

1. Technical Field

The present disclosure relates to a lighting control device, a lighting system, and a method of controlling a lighting device, which control a lighting characteristic of a lighting device.

2. Description of the Related Art

The dimming or toning, for example, of a lighting device may be controlled by operating, for example, a remote control. However, when a remote control is used, the user is burdened with having to, for example, search for the remote control and/or move to the location of the remote control. For this reason, there is a lighting system that controls the dimming or toning, for example, of a lighting device in response to gestures made by a user. Japanese Unexamined Patent Application Publication (Translation of PCT Application) No. 2011-501365 discloses a technique related to such a lighting system.

SUMMARY

For example, when two or more people are working individually in their own areas inside a single space, there are situations in which a person wants to change the brightness only in the region in which they are working without having to significantly interrupt their work. In such situations, there is a demand to be able to intuitively control a lighting characteristic of a desired lighting device by, for example, grabbing or touching the light output by the desired lighting device by hand.

In light of this, the present disclosure has an object to provide a lighting control device, a lighting system, and a method of controlling a lighting device which are capable of changing a lighting characteristic of a desired lighting device in response to an intuitive gesture made by the user's hand with respect to the light output by the lighting device.

In one aspect, a lighting control device includes: a sensor that detects a state of a user and a gesture made by the user; and a controller that controls a lighting characteristic of one or more lighting devices. The sensor detects a first state and a second state of a hand of the user. In response to the sensor detecting the hand of the user in the first state aiming at one lighting device among the one or more lighting devices, the controller designates the one lighting device as a control target lighting device, and in response to the sensor detecting a predetermined gesture involving the hand in the second state, the controller controls a lighting characteristic of the control target lighting device.

In one aspect, a lighting system includes the above-described lighting control device and the lighting device that is controlled by the lighting control device and has a changeable lighting characteristic.

In one aspect, a method of controlling a lighting device includes: detecting a first state and a second state of a hand of the user; in response to detecting the hand of the user in the first state aiming at one lighting device among one or more lighting devices, designating the one lighting device as a control target lighting device; and in response to detecting a predetermined gesture involving the hand in the second state, changing a lighting characteristic of the control target lighting device.

Accordingly, the lighting control device, the lighting system, and the method of controlling a lighting device are capable of changing a lighting characteristic of a desired lighting device in response to an intuitive gesture made by the user's hand with respect to the light output by the lighting device.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, an exemplary embodiment will be described in detail with reference to the accompanying drawings. The exemplary embodiment described below illustrates a preferred, specific example of the present disclosure. The Shapes, elements, the arrangement and connection of the elements, etc., in the following exemplary embodiment are merely examples, and therefore are not intended to limit the inventive concept. Therefore, among the elements in the following exemplary embodiment, those not recited in any of the independent claims defining the most generic part of the inventive concept are described as optional elements belonging to a more preferred embodiment. Also note that the drawings are represented schematically and are not necessarily precise illustrations.

Embodiment

Hereinafter, an embodiment will be described in detail with reference to FIG. 1 through FIG. 10.
(Lighting System Configuration)

Figure 1:
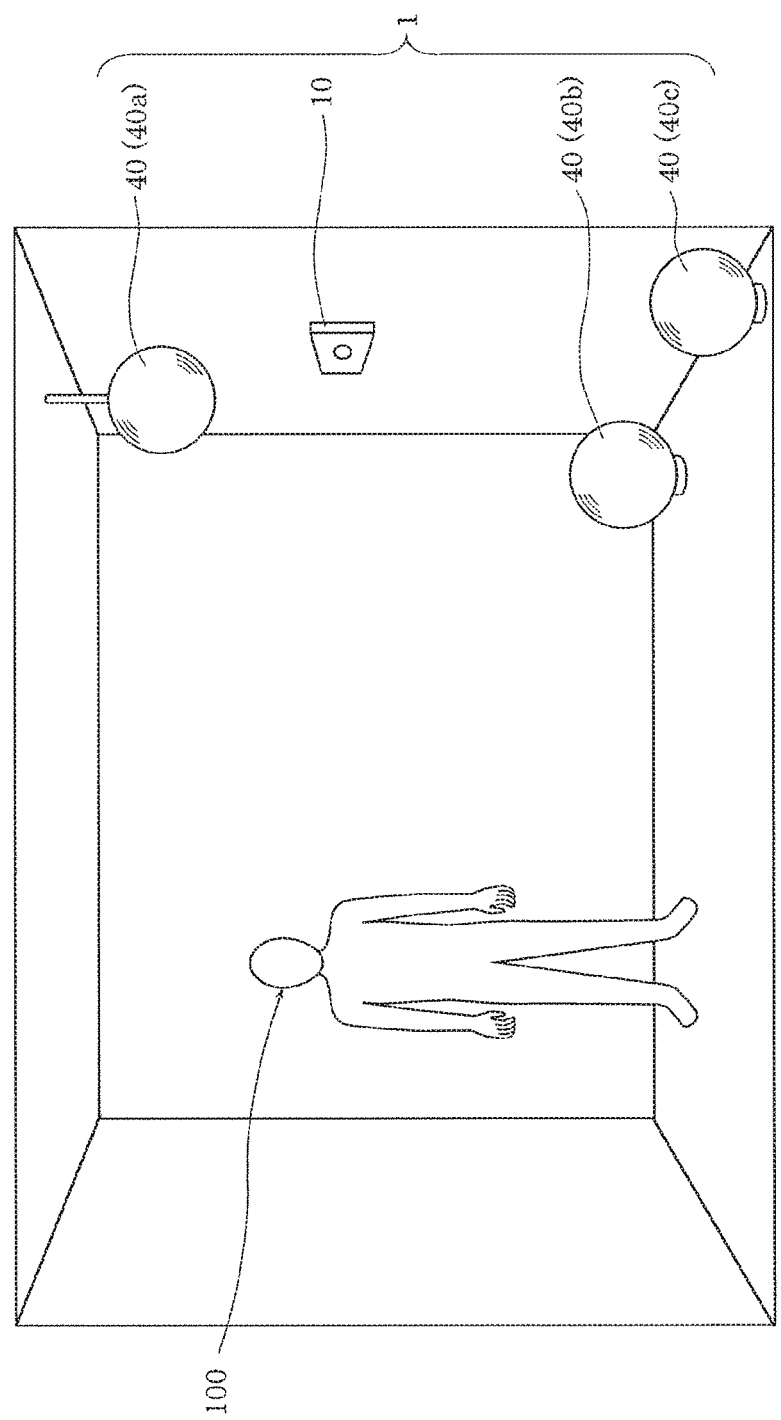
FIG. 1 illustrates an installation example of a lighting system according to an embodiment.

FIG. 1 illustrates an installation example of lighting system 1 according to an embodiment.

Lighting system 1 is a lighting system that controls a lighting characteristic of one or more lighting devices 40 in accordance with a state of user 100 and a gesture made by user 100, and is, for example, a lighting system used in an interior space (i.e., a room) of a building. Lighting system 1 includes lighting control device 10 and one or more lighting devices 40. Lighting control device 10 detects user 100 and controls one or more lighting devices 40 on the basis of the result of the detection of user 100, as illustrated in FIG. 1. Lighting control device 10 will be described in more detail, with reference to FIG. 2 later. Lighting device 40 emits light whose lighting characteristics are controlled by lighting control device 10. Lighting device 40 will also be described in more detail with reference to FIG. 2 later. FIG. 1 illustrates lighting devices 40a through 40c. Note that the number of lighting devices 40 is not limited to 3; lighting system 1 may include one or more lighting devices 40.

Figure 2:
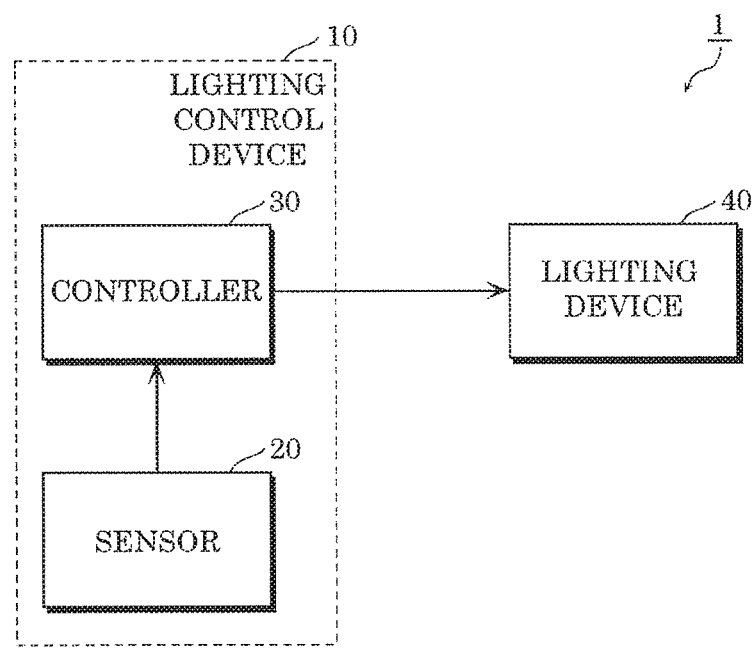
FIG. 2 is a configuration diagram of one example of a lighting system according to an embodiment.

FIG. 2 is a configuration diagram of one example of lighting system 1 according to an embodiment.

As is also illustrated in FIG. 1, lighting system 1 includes lighting control device 10 and one or more lighting devices 40.

Lighting control device 10 is a device for detecting user 100 and controlling lighting characteristics of lighting device 40, and includes sensor 20 and controller 30. The lighting characteristics of lighting device 40 controlled by lighting control device 10 include the emission and non-emission of light by lighting device 40, the brightness of projection region 41, and the color temperature of projection region 41.

Sensor 20 detects the state of user 100 and gestures made by user 100. More specifically, sensor 20 detects a first state and a second state of a hand of user 100. Here, the first state is, for example, an open hand. The second state is a closed fist. Moreover, as the state of user 100, sensor 20 detects the positional relationship between a hand of user 100 and lighting device 40. Examples of gestures made by user 100 include, for example, user 100 moving his or her hand closer to or away from lighting device 40, or user 100 waving his or her hand. In this way, sensor 20 is capable of detecting both a given state of user 100 and a given gesture made by user 100.

Sensor 20 includes, for example, a camera. More specifically, the camera is an infrared camera. Sensor 20 includes, for example, an infrared light source (not illustrated in the drawings) and an infrared camera (not illustrated in the drawings). The infrared, light source is a light source that spatially disperses and emits a plurality of infrared light rays, and projects a test pattern with infrared light. The infrared camera captures the test pattern reflected off an object (in this embodiment, the object is user 100). With this, the state of user 100 and gestures made by user 100 can be detected by detecting the shape and changes in the reflected test pattern. Note that sensor 20 is not limited to a sensor that includes an infrared light source and infrared camera; sensor 20 may be any sensor capable of detecting the three-dimensional form and movement of an object.

Controller 30 controls a lighting characteristic of one or more lighting devices 40. In response to sensor 20 detecting a hand in the first state aiming at a one lighting device 40 among the one or more lighting devices 40, controller 30 designates the one lighting device 40 as a control target lighting device 40. This will be described in more detail later with reference to FIG. 3 through FIG. 10. Then, controller 30 controls a lighting characteristic of the control target lighting device 40 in response to sensor 20 detecting a predetermined gesture involving a hand in the second state. Controller 30 determines whether a state of user 100 and a gesture made by user 100 detected by sensor 20 matches a state and gesture indicated in information stored in a storage (not illustrated in the drawings) included in lighting control device 10, for example. For example, controller 30 determines whether a gesture involving a hand in the second state detected by sensor 20 matches a predetermined gesture indicated in information stored in the storage in lighting control device 10. When controller 30 determines that a gesture made by user 100 and detected by sensor 20 matches a predetermined gesture indicated in information stored in the storage, controller 30 performs control in accordance with the information stored in the storage in lighting device 40. For example, when controller 30 determines that a gesture made by user 100 and detected by sensor 20 matches a gesture indicated by information associated with increasing the brightness of lighting device 40, controller 30 increases the brightness of lighting device 40.

Lighting device 40 is a lighting device controlled by lighting control device 10 and has a changeable lighting characteristic. Lighting device 40 is controlled by lighting control device 10 by communicating with lighting control device 10 via a wired or wireless connection.

The brightness and color temperature of lighting device 40 are also changeable. Dimming is performed as a result of controller 30 changing the dimming ratio by adjusting the light output of the light source included in lighting device 40. Moreover, for example, lighting device 40 includes a plurality of light sources that include a blue light LED and a yellow phosphor, and emit light of mutually different color temperatures, and the color tone is adjusted as a result of controller 30 adjusting the light output ratio of each light source to alter the color temperature of light output by lighting device 40. Note that lighting device 40 may include, for example, a light source including a red light LED, green light LED, and blue light LED, and the color tone may be adjusted as a result of controller 30 adjusting the light output ratios of the red light LED, green light LED, and blue light LED to alter the color temperature of the light output by lighting device 40. Alternatively, lighting device 40 may include a plurality of light sources including a near-ultraviolet LED and an RGB phosphor, and the color tone may be adjusted as a result of controller 30 adjusting the light output ratio of each light source to alter the color temperature of light output by lighting device 40. In other words, lighting device 40 may be any whose color temperature is changeable.
(Operations for Designating One Lighting Device as Control Target Lighting Device)

Next, operations for designating one lighting device 40 as a control target lighting device 40 performed by lighting control device 10 will be described with reference to FIG. 3 and FIG. 4.

Figure 3:
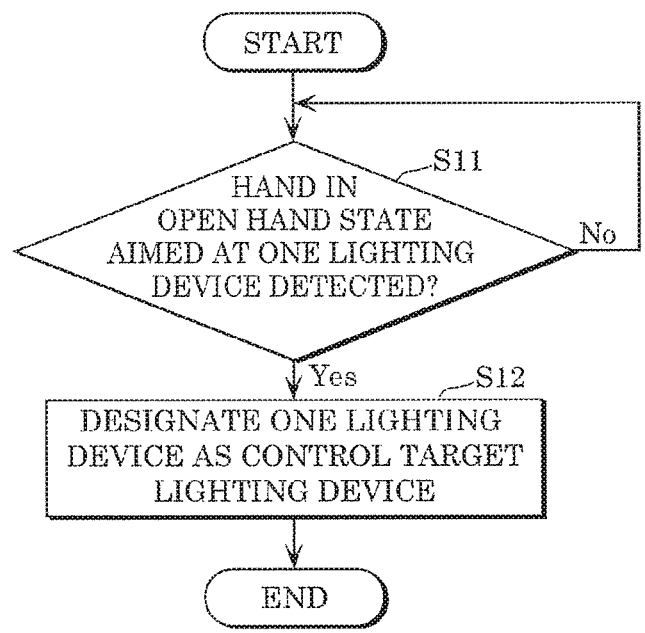
FIG. 3 is a flow chart illustrating an example of operations for designating one lighting device as a control target lighting device performed by a lighting control device according to an embodiment.

FIG. 3 is a flow chart illustrating an example of operations for designating one lighting device 40 as a control target lighting device 40 performed by lighting control device 10 according to an embodiment.

First, controller 30 determines whether or not sensor 20 has detected hand 110 in an open hand state aiming at one lighting device 40 (step S11). Here, the one lighting device 40 is exemplified as lighting device 40a illustrated in FIG. 1, and hereinafter, "one lighting device 40 (control target lighting device 40)" is also referred to as "lighting device 40a".

When controller 30 determines that sensor 20 has not detected hand 110 in an open hand state aiming at one lighting device 40 (No in step S11), controller 30 repeats step S11 until sensor 20 detects hand 110 in an open hand state aiming at one lighting device 40.

When controller 30 determines that sensor 20 has detected hand 110 in an open hand state aiming at one lighting device 40 (Yes in step S11), controller 30 designates the one lighting device 40 as the control target lighting device 40 (step S12). Next, the processing involved in steps S11 and S12 will be described in detail with reference to FIG. 4.

Figure 4:
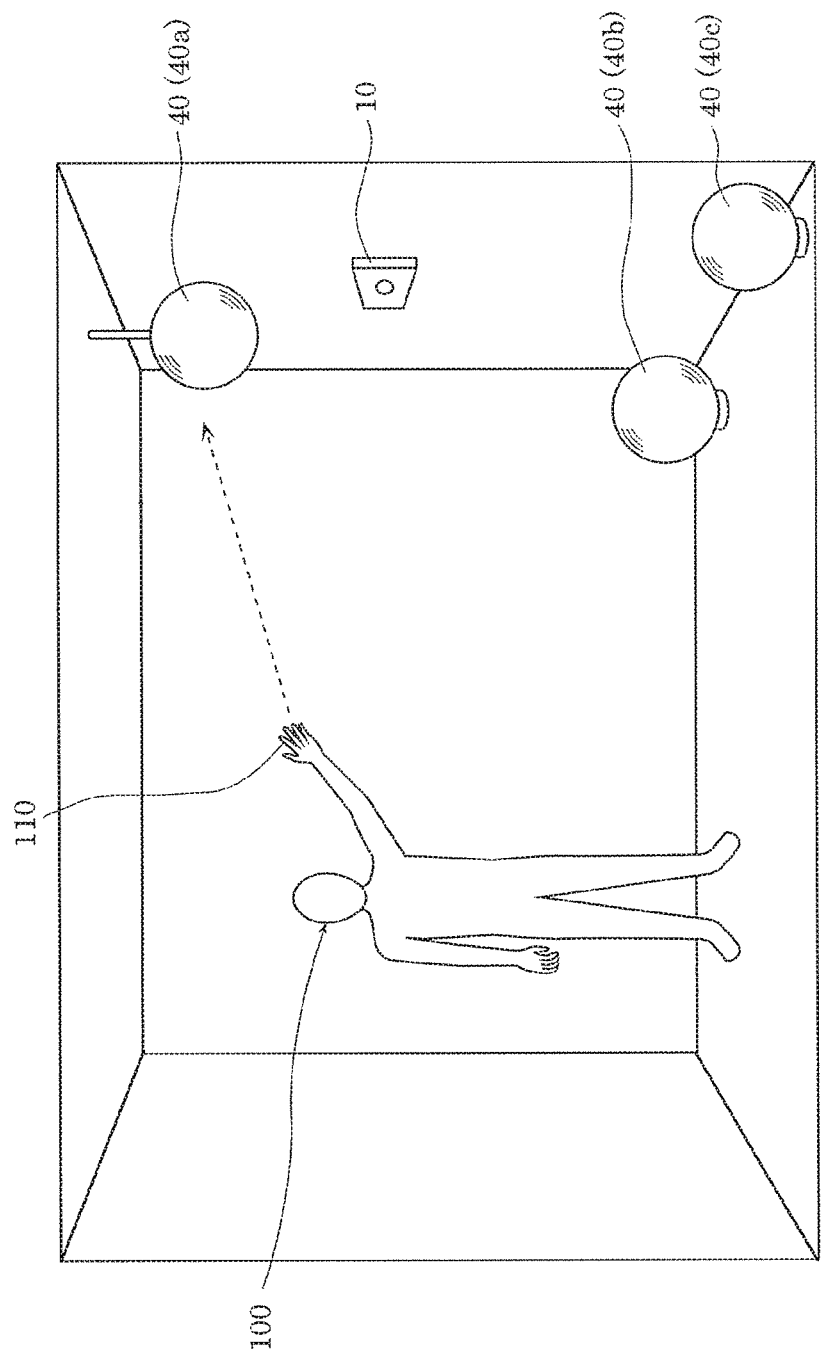
FIG. 4 is for illustrating operations for designating one lighting device as a control target lighting device performed by a lighting control device according to an embodiment.

FIG. 4 is a flow chart for illustrating operations for designating one lighting device 40 as a control target lighting device 40 performed by lighting control device 10 according to an embodiment.

As illustrated in FIG. 4, user 100 is aiming hand 110 at lighting device 40a. Here, a state in which hand 110 is aiming at lighting device 40a refers to a state in which, between user 100 and lighting device 40a, user 100 has his or her arm stretched out such that hand 110 is oriented toward lighting device 40a, as illustrated in FIG. 4. In response to this, controller 30 designates lighting device 40a as the control target lighting device 40, and controls lighting device 40a in accordance with a subsequent gesture made by user 100. Note that when controller 30 determines that sensor 20 has detected hand 110 in an open hand state aiming at lighting device 40b, controller 30 designates lighting device 40b as the control target lighting device 40. Similarly, when controller 30 determines that sensor 20 has detected hand 110 in an open hand state aiming at lighting device 40c, controller 30 designates lighting device 40c as the control target lighting device 40. Note that although user 100 is aiming his or her right hand at lighting device 40a in this embodiment, user 100 may aim his or her left hand at lighting device 40a.

In this way, in response to sensor 20 detecting hand 110 in the first state (open hand state) aiming at one lighting device 40, controller 30 designates the one lighting device 40 as a control target lighting device 40.

(Operations for Changing Lighting Device Brightness)

Next, among operations for controlling lighting characteristics of lighting device 40 performed by lighting control device 10, operations for changing the brightness of lighting device 40 will be described with reference to FIG. 5 and FIG. 6.

Figure 5:
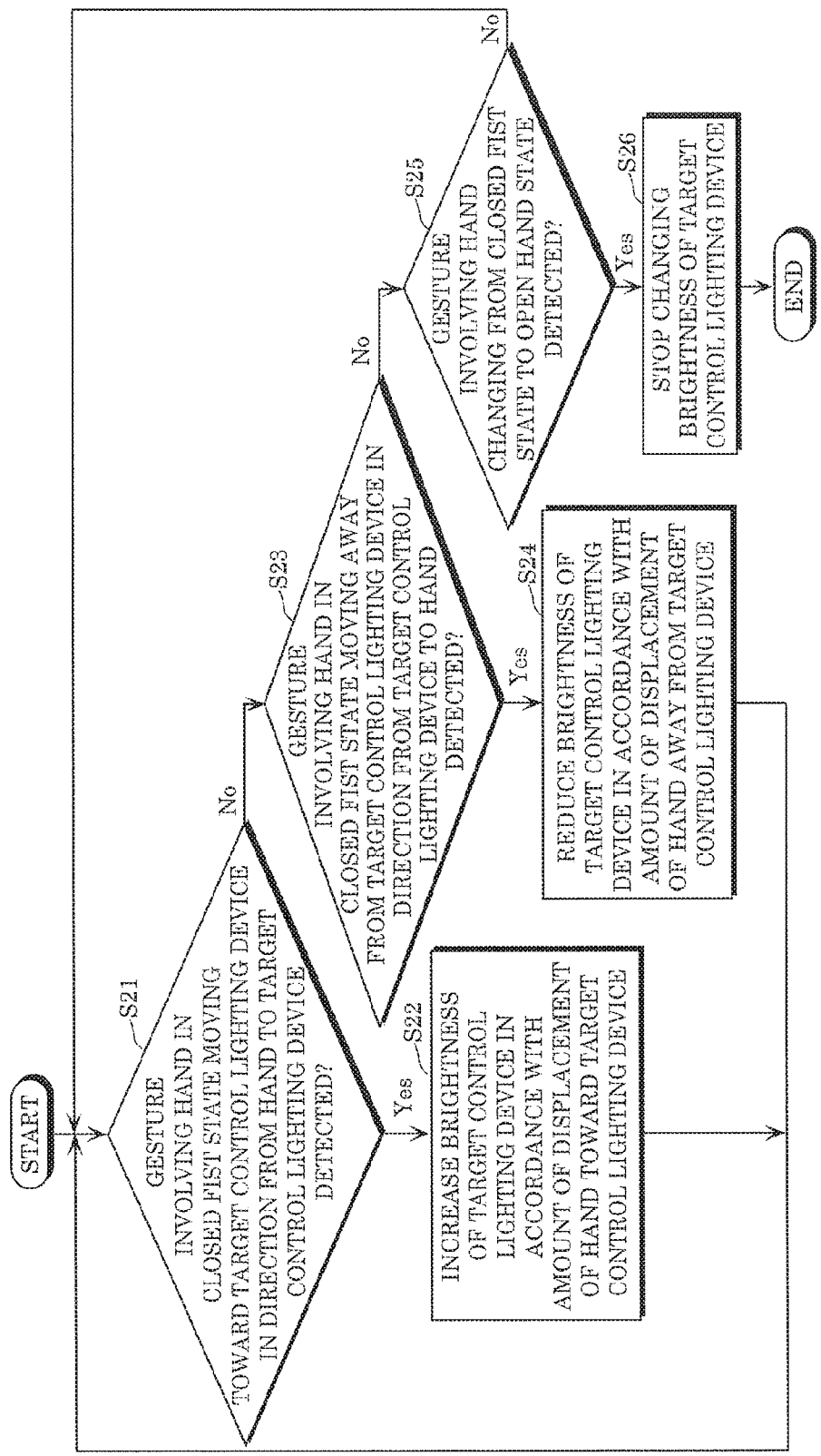
FIG. 5 is a flow chart illustrating an example of operations for changing the brightness of a control target lighting device performed by a lighting control device according to an embodiment.

FIG. 5 is a flow chart illustrating an example of operations for changing the brightness of the control target lighting device 40 performed by lighting control device 10 according to an embodiment.

First, controller 30 determines whether or not sensor 20 has detected a gesture involving hand 110 in a closed fist state moving closer to lighting device 40a in a direction from hand 110 toward lighting device 40a (step S21). In other words, controller 30 determines whether or not sensor 20 has detected (i) hand 110 in a closed fist state and further (ii) a gesture involving hand 110 in a closed fist state moving closer to lighting device 40a. Note that controller 30 may determine whether or not sensor 20 has detected (i) a gesture involving hand 110 being in a closed fist state and further (ii) a gesture involving hand. 110 in a closed fist state moving closer to lighting device 40a.

When controller 30 determines that sensor 20 has detected a gesture involving hand 110 in a closed fist state moving closer to lighting device 40a in a direction from hand 110 toward lighting device 40a (Yes in step S21), controller 30 increases the brightness of lighting device 40a in accordance with the amount of displacement of hand 110 toward lighting device 40a (step S22). This makes it possible for user 100 to increase the brightness of lighting device 40a by moving hand 110 in a closed fist state closer to lighting device 40a. Then, step S21 is performed again.

On the other hand, when controller 30 determines that sensor 20 has not detected a gesture involving hand 110 in a closed fist state moving closer to lighting device 40a in a direction from hand 110 toward lighting device 40a (No in step S21), controller 30 determines whether or not sensor 20 has detected a gesture involving hand 110 in a closed fist state moving away from lighting device 40a in a direction from lighting device 40a toward hand 110 (step S23). In other words, controller 30 determines whether or not sensor 20 has detected (i) hand 110 in a closed fist state and further (ii) a gesture involving hand 110 in a closed fist state moving away from lighting device 40a.

When controller 30 determines that sensor 20 has detected a gesture involving hand 110 in a closed fist state moving away from lighting device 40a in a direction from lighting device 40a to hand 110 (Yes in step S23), controller 30 reduces the brightness of lighting device 40a in accordance with the amount of displacement of hand 110 away from lighting device 40a (step S24). This makes it possible for user 100 to reduce the brightness of lighting 40a by moving hand 110 in a closed fist state away from lighting device 40a. Then, step S21 is performed again.

In this way, in step S22 or step S24, the brightness of lighting device 40a can be changed to a level desired by user 100 in accordance with a gesture involving a change in distance between hand 110 in a closed fist state and lighting device 40a. Here, a gesture involving a change in distance between lighting device 40a means a gesture involving movement in a direction from user 100 toward lighting device 40a or a gesture involving movement in a direction from lighting device 40a toward user 100. More specifically, a gesture involving movement in a direction from user 100 toward lighting device 40a and a gesture involving movement in a direction from lighting device 40a toward user 100 are gestures achieved by user 100 extending hand 110 toward lighting device 40a or retracting hand 110 from lighting device 40a toward user 100.

On the other hand, when controller 30 determines that sensor 20 has not detected a gesture involving hand 110 in a closed fist state moving away from lighting device 40a in a direction from lighting device 40a toward hand 110 (No in step S23), controller 30 determines whether or not sensor 20 has detected a gesture involving hand 110 changing from a closed fist state to an open hand state (step S25). Step 25 is performed when there is no change in distance between hand 110 in a closed fist state and lighting device 40a.

When controller 30 determines that sensor 20 has detected a gesture involving hand 110 changing from a closed fist state to an open hand state (Yes in step S25), controller 30 stops changing the brightness of lighting device 40a (step S26).

When controller 30 determines that sensor 20 has not detected a gesture involving hand 110 changing from a closed fist state to an open hand state (No in step S25), step S21 is performed again.

In this way, the brightness of lighting device 40a is fixed to the brightness changed to in step S22 or S24. In other words, lighting control device 10 is in a "lighting device 40a brightness change" mode until user 100 opens the palm of hand 110, and fixes the brightness of lighting device 40a in accordance with the position of hand 110 ultimately decided on by user 100 as indicated by user 100 opening the palm of hand 110.

Next, operations for changing the brightness of lighting device 40a in steps S21 and S24, and operations for fixing the brightness of lighting device 40a in steps S25 and S26 will be described with reference to FIG. 6.

Figure 6:
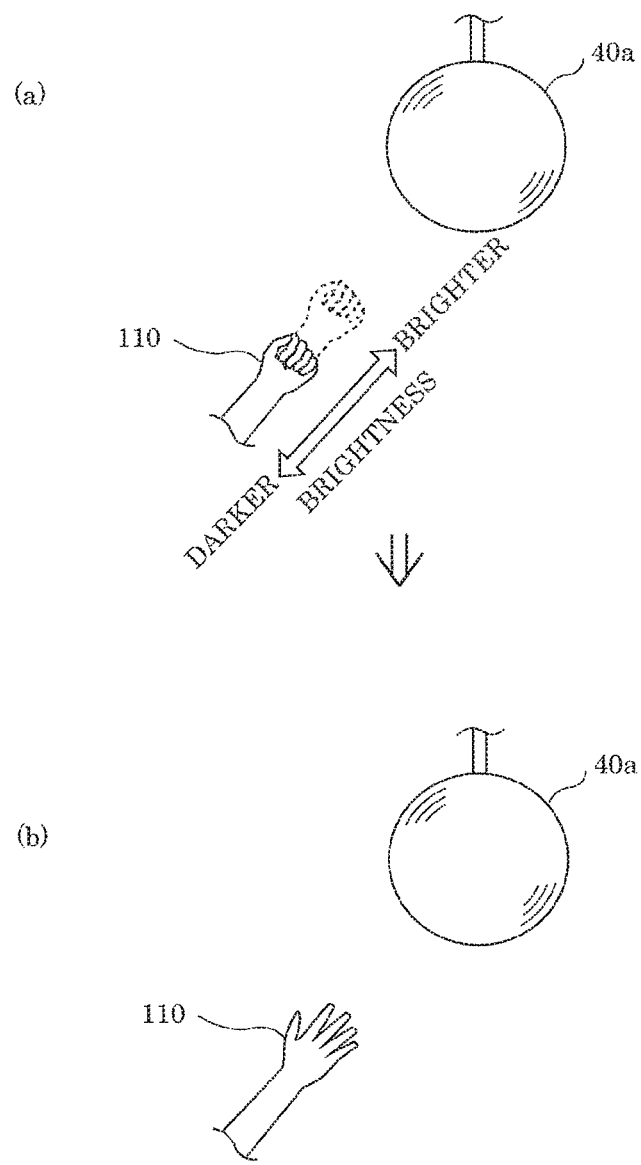
FIG. 6 is for illustrating operations for changing the brightness of control target lighting device performed by a lighting control device according to an embodiment.

FIG. 6 is for illustrating operations for changing the brightness of the control target lighting device 40 performed by lighting control device 10 according to an embodiment.

FIG. 6 illustrates, in (a), hand 110 in a closed fist state moving closer to and away from lighting device 40a in a direction from hand 110 toward lighting device 40a and from lighting device 40a toward hand 110, respectively. The arrow in (a) in FIG. 6 illustrates that the closer to lighting device 40a hand 110 in a closed fist state moves, the brighter lighting device 40a becomes, and the farther away from lighting device 40a hand 110 in a closed fist state moves, the darker lighting device 40a becomes. In this way, it is possible for user 100 to adjust the brightness of lighting device 40a designated as the control target lighting device 40 by moving hand 110 in a closed fist state closer to or away from lighting device 40a in a direction from user 100 toward lighting device 40a or in a direction from lighting device 40a toward user 100, respectively.

FIG. 6 illustrates, in (b), hand 110 after changing from a closed fist state to an open hand state. With this, user 100 can fix the brightness of lighting device 40a to a desired brightness by opening the palm of hand 110 in a position corresponding to the desired brightness.

In this way, controller 30 controls a lighting characteristic (the brightness) of the control target lighting device 40 in response to sensor 20 detecting a predetermined gesture involving hand 110 in the second state (closed fist state). More specifically, controller 30 controls a lighting characteristic (the brightness) of the control target lighting device 40 in response to sensor 20 detecting a gesture involving a change in distance between hand 110 in the second state (closed fist state) and the control target lighting device 40. Even more specifically, controller 30 changes the brightness of the control target lighting device 40 in response to sensor 20 detecting one of a gesture involving hand 110 in the second state (closed fist state) moving in a direction from user 100 toward the control target lighting device 40 and a gesture involving hand 110 in the second state moving in a direction from the control target lighting device 40 toward user 100. Then, controller 30 stops changing the brightness of the control target lighting device 40 in response to sensor 20 detecting a gesture involving hand 110 changing from the second state (closed fist state) to the first state (open hand state).

(Operations for Changing Lighting Device Color Temperature)

Next, among operations for controlling lighting characteristics of lighting device 40 performed by lighting control device 10, operations for changing the color temperature of lighting device 40 will be described with reference to FIG. 7 and FIG. 8.

Figure 7:
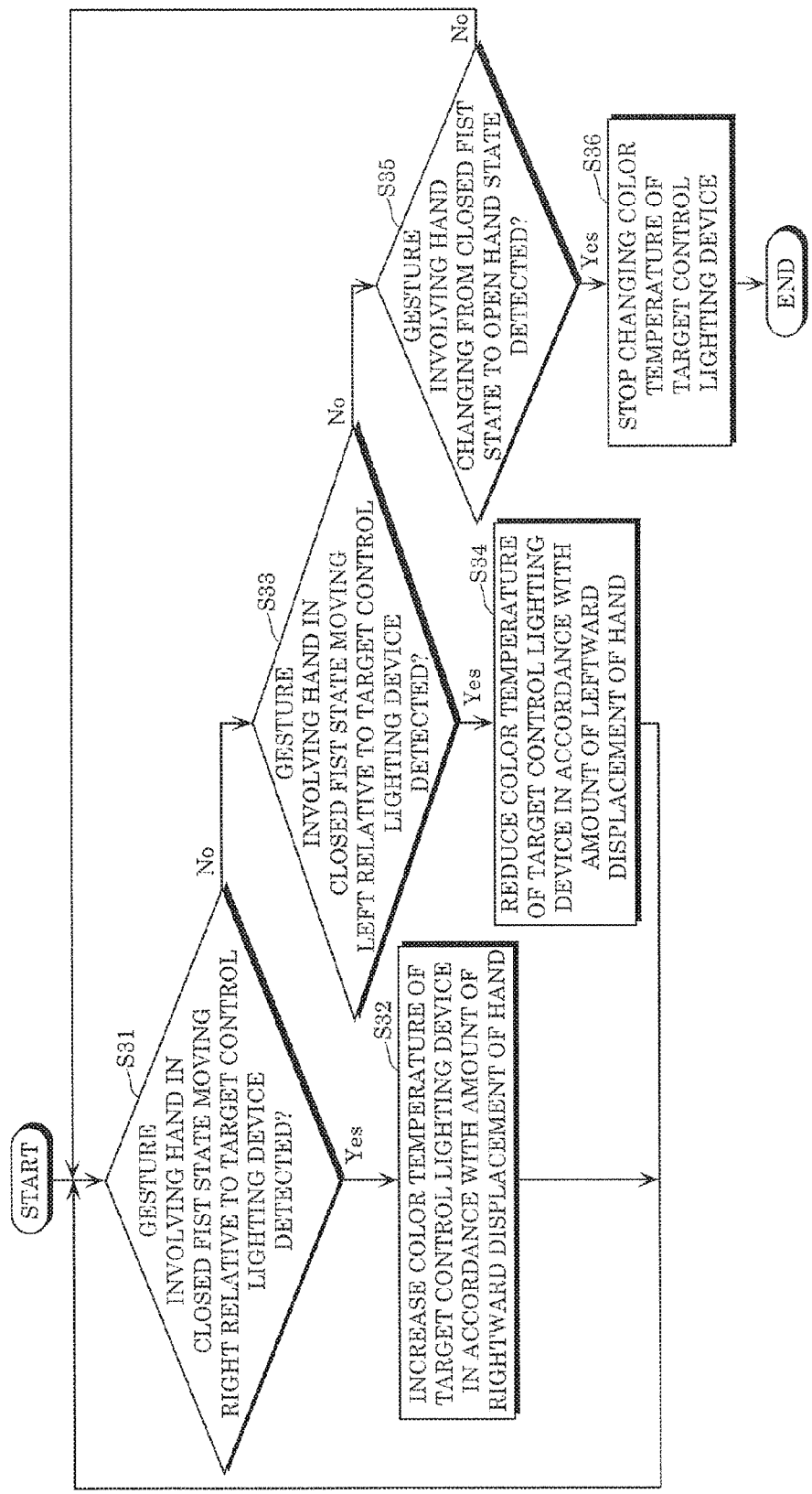
FIG. 7 is a flow chart illustrating an example of operations for changing the color temperature of a control target lighting device performed by a lighting control device according to an embodiment.

FIG. 7 is a flow chart illustrating an example of operations for changing the color temperature of control target lighting device 40 performed by lighting control device 10 according to an embodiment.

First, controller 30 determines whether or not sensor 20 has detected a gesture involving hand 110 in a closed fist state moving right relative to lighting device 40a (step S31). Here, "right relative to lighting device 40a" is, for example, among directions substantially perpendicular to a direction from user 100 toward lighting device 40a, a direction to the right from the perspective of user 100. Controller 30 determines whether or not sensor 20 has detected (i) hand 110 in a closed fist state and further (ii) a gesture involving hand 110 in a closed fist state moving right relative to lighting device 40a. Note that controller 30 may determine whether or not sensor 20 has detected (i) a gesture involving hand 110 being in a closed fist state and further (ii) a gesture involving hand 110 in a closed fist state moving right relative to lighting device 40a.

When controller 30 determines that sensor 20 has detected a gesture involving hand 110 in a closed fist state moving right relative to lighting device 40a (Yes in step S31), controller 30 increases the color temperature of lighting device 40a in accordance with the amount of displacement of hand 110 to the right (step S32). This makes it possible for user 100 to increase the color temperature of lighting device 40a by moving hand 110 in a closed fist state right relative to lighting device 40a. Then, step S31 is performed again.

On the other hand, when controller 30 determines that sensor 20 has not detected a gesture involving hand 110 in a closed fist state moving right relative to lighting device 40a (No in step S31), controller 30 determines whether or not sensor 20 has detected hand 110 in a closed fist state moving left relative to lighting device 40a (step S33). Here, "left relative to lighting device 40a" is, for example, among directions substantially perpendicular to a direction from user 100 toward lighting device 40a, a direction to the left from the perspective of user 100. Controller 30 determines whether or not sensor 20 has detected (i) hand 110 in a closed fist state and further (ii) a gesture involving hand 110 in a closed fist state moving left relative to lighting device 40a.

When controller 30 determines that sensor 20 has detected a gesture involving hand 110 in a closed fist state moving left relative to lighting device 40a (Yes in step S33), controller 30 reduces the color temperature of lighting device 40a in accordance with the amount of displacement of hand 110 to the left (step S34). This makes it possible for user 100 to reduce the color temperature of lighting device 40a by moving hand 110 in a closed fist state left relative to lighting device 40a. Then, step S31 is performed again.

In this way, in step S32 or step S34, the color temperature of lighting device 40a can be changed to a level desired by user 100 in accordance with a gesture involving a change in distance between hand 110 in a closed fist state and lighting device 40a. Here, a gesture involving a change in distance between lighting device 40a means a gesture involving movement in a direction substantially perpendicular to a direction from user 100 toward lighting device 40a. More specifically, a gesture involving movement in a direction substantially perpendicular to a direction from user 100 toward lighting device 40a is a gesture achieved by user 100 waving hand 110 left or right relative to lighting device 40a.

On the other hand, when controller 30 determines that sensor 20 has not detected a gesture involving hand 110 in a closed fist state moving left relative to lighting device 40a (No in step S33), controller 30 determines whether or not sensor 20 has detected a gesture involving hand 110 changing from a closed fist state to an open hand state (step S35). Step 35 is performed when there is no change in distance between hand 110 in a closed fist state and lighting device 40a.

When controller 30 determines that sensor 20 has detected a gesture involving hand 110 changing from a closed fist state to an open hand state (Yes in step S35), controller 30 fixes the color temperature of lighting device 40a (step S36).

When controller 30 determines that sensor 20 has not detected a gesture involving hand 110 changing from a closed fist state to an open hand state (No in step S35), step S31 is performed again.

In this way, the color temperature of lighting device 40a is fixed color temperature changed to in step S32 or S44. In other words, lighting control device 10 is in a "lighting device 40a color temperature change" mode until user 100 opens the palm of hand 110, and fixes the color temperature of lighting device 40a in accordance with the position of hand 110 ultimately decided on by user 100 as indicated by user 100 opening the palm of hand 110. Note that at this time, lighting control device 10 is also in a "lighting device 40a brightness change" mode. As such, the brightness and color temperature of lighting device 40a is fixed in accordance with the position of hand 110 ultimately decided on by user 100 as indicated by user 100 opening the palm of hand 110.

Next, operations for changing the color temperature of lighting device 40a in steps S31 and S34, and operations for fixing the color temperature of lighting device 40a in steps S35 and S36 will be described with reference to FIG. 8.

Figure 8:
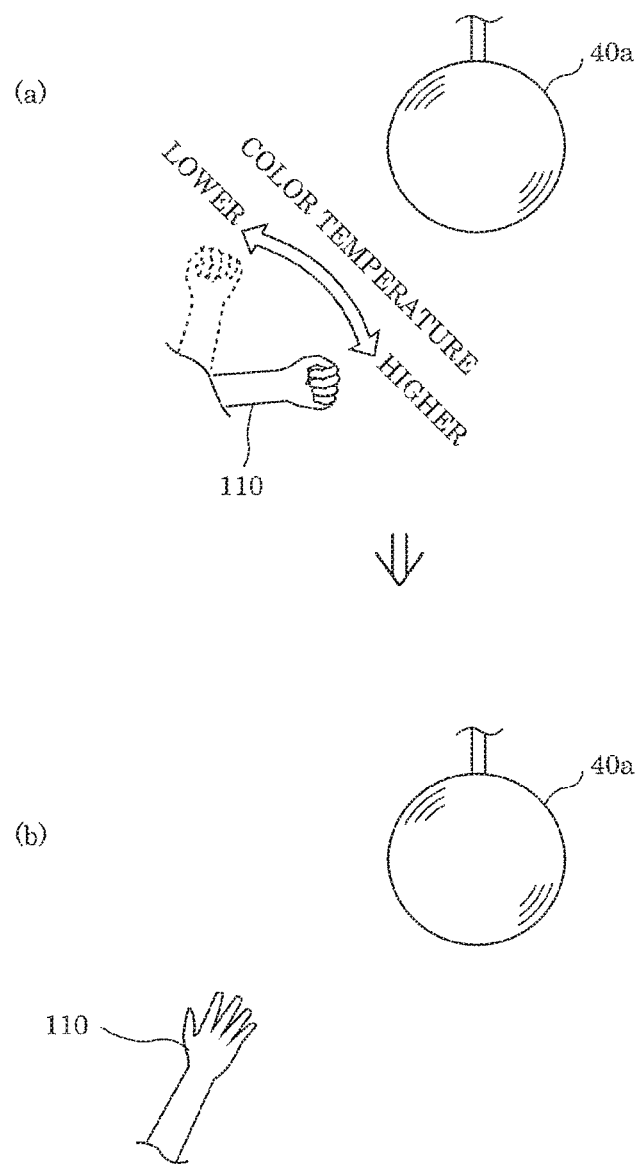
FIG. 8 is for illustrating operations for changing the color temperature of a control target lighting device performed by a lighting control device according to an embodiment.

FIG. 8 is for illustrating operations for changing the color temperature of the control target lighting device 40 performed by lighting control device 10 according to an embodiment.

FIG. 8 illustrates, in (a), hand 110 in a closed fist state moving right and left relative to lighting device 40a. The arrow in (a) in FIG. 8 illustrates that the farther to the right hand 110 in a closed fist state moves relative to lighting device 40a, the higher the color temperature of lighting device 40a becomes, and the farther to the left hand 110 in a closed fist state moves relative to lighting device 40a, the lower the color temperature of lighting device 40a becomes. In this way, it is possible for user 100 to adjust the color temperature of lighting device 40a designated as the control target lighting device 40 by moving hand 110 in a closed fist state right or left in a direction substantially perpendicular to a direction from user 100 toward lighting device 40a.

FIG. 8 illustrates, in (b), hand 110 after changing from a closed fist state to an open hand state. With this, user 100 can fix the color temperature of lighting device 40a to a desired color temperature by opening the palm of band 110 in a position corresponding to the desired color temperature.

In this way, controller 30 controls a lighting characteristic (the color temperature) of the control target lighting device 40 in response to sensor 20 detecting a predetermined gesture involving hand 110 in the second state (closed fist state). More specifically, controller 30 controls a lighting characteristic (the color temperature) of the control target lighting device 40 in response to sensor 20 detecting a gesture involving a change in distance between hand 110 in the second state (closed fist state) and the control target lighting device 40. Even more specifically, controller 30 changes the color temperature of the control target lighting device 40 in response to sensor 20 detecting a gesture involving hand 110 in the second state (closed fist state) moving in a direction substantially perpendicular to a direction from user 100 toward the control target; lighting device 40. Then, controller 30 stops changing the color temperature of the control target lighting device 40 in response to sensor 20 detecting a gesture involving hand 110 changing to the first state (a gesture involving hand 110 changing to an open hand state).

(Operations for Turning Off Lighting Device)

Next, among operations for controlling lighting characteristics of lighting device 40 performed by lighting control device 10, operations for turning off lighting device 40 will be described with reference to FIG. 9 and FIG. 10.

Figure 9:
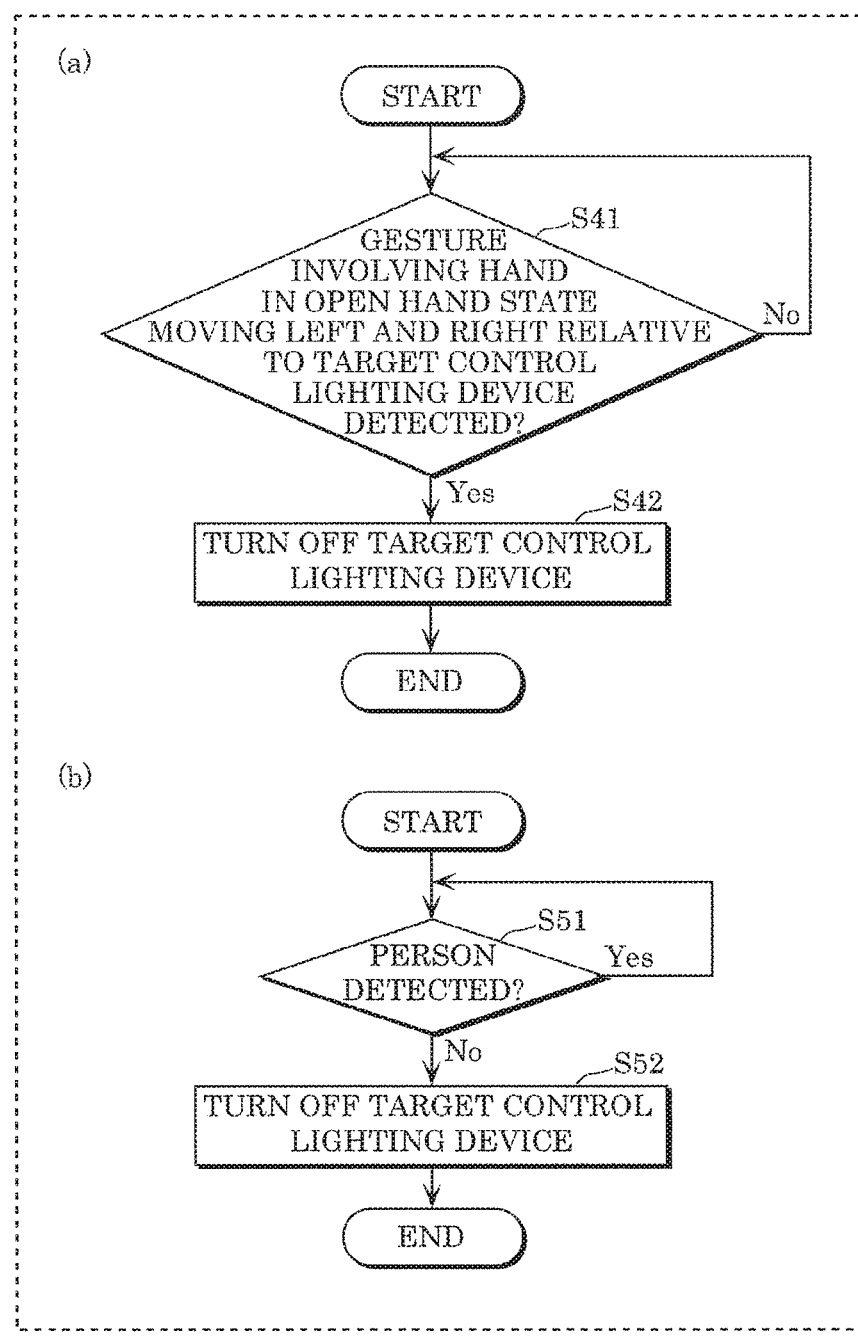
FIG. 9 is a flow chart illustrating an example of operations for turning off a control target lighting device performed by a lighting control device according to an embodiment.

FIG. 9 is a flow chart illustrating an example of operations for turning off the control target lighting device 40 performed by lighting control device 10 according to an embodiment.

The flowchart in (a) in FIG. 9 illustrates an example of operations for turning off the control target lighting device 40 via a gesture involving hand 110.

First, controller 30 determines whether or not sensor 20 has detected a gesture involving hand 110 in an open hand state moving left and right relative to lighting device 40a (step S41). A gesture involving hand 110 moving left and right relative to lighting device 40a is a gesture achieved by user 100 waving hand 110 left and right relative to lighting device 40a.

When controller 30 determines that sensor 20 has not detected a gesture involving hand 110 in an open hand state moving left and right relative to lighting device 40a (No in step S41), step S41 is repeated until sensor 20 detects hand 110 in an open hand state moving left and right relative to lighting device 40a.

When controller 30 determines that sensor 20 has detected a gesture involving hand 110 in an open hand state moving left and right relative to lighting device 40a (Yes in step S41), controller 30 turns off lighting device 40a (step S42). The processing involved, in steps S41 and S42 will be described in detail later with reference to FIG. 10.

In this way, controller 30 turns off the control target lighting device 40 in response to sensor 20 detecting a gesture involving hand 110 in the first state (open hand state) moving in a direction substantially perpendicular to a direction from user 100 toward the control target lighting device 40.

The flowchart in (b) in FIG. 9 illustrates an example of operations for turning off the control target lighting device 40 via means other than a gesture involving hand 110.

First, controller 30 determines whether or not sensor 20 has detected a person (user 100) in a given range (step S51). Here, a "given range" refers to, for example, the projection region illuminated by lighting device 40a when lighting device 40a is designated as the control target lighting device 40.

When controller 30 determines that sensor 20 has detected user 100 in the given range (Yes in step S51), step S51 is repeated until controller 30 determines that sensor 20 has not detected user 100 in the given range.

When controller 30 determines that sensor 20 has not detected user 100 in the given range (No in step S51), controller 30 turns off lighting device 40a (step S52). In other words, since there is no need for lighting device 40a to be on after user 100 has left the projection region illuminated by lighting device 40a, lighting device 40a is turned off.

In this way, controller 30 turns off the control target lighting device 40 when sensor 20 does not detect user 100 in a given range. Note that the "given range" may be a detectable range of sensor 20. In this case, controller 30 may turn off one or more lighting device 40 associated with sensor 20 (for example, lighting device 40a through 40c) when sensor 20 does not detect user 100 in the detectable range.

Next, operations involved in steps S41 and S42 for turning off lighting device 40 via a gesture involving hand 110 will be described with reference to FIG. 10.

Figure 10:
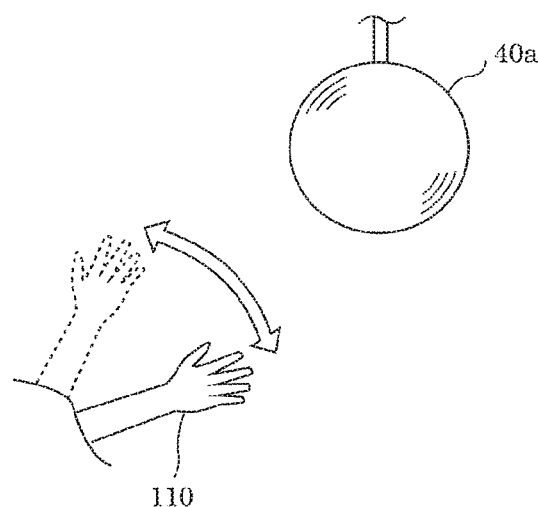
FIG. 10 is for illustrating operations for turning off a control target lighting device performed by a lighting control device according to an embodiment.

FIG. 10 is for illustrating operations for turning off the control target lighting device 40 performed by lighting control device 10 according to an embodiment.

FIG. 10 illustrates user 100 waving hand 110 in an open hand state left and right relative to lighting device 40a. Waving hand 110 left and right while hand 110 is in an open hand state corresponds to a gesture for saying "goodbye". In other words, user 100 can turn off lighting device 40a by making a gesture for saying "goodbye" to lighting device 40a. In this way, it is possible for user 100 to turn off lighting device 40a designated as the control target lighting device 40 by moving hand 110 in an open hand state left and right, in a direction substantially perpendicular to a direction from user 100 toward lighting device 40a.

Note that control of a lighting characteristic of the control target lighting device 40 in accordance with a state of hand 110 and a gesture involving hand 110 is performed on one lighting device 40 designated as the control target lighting device 40 (in this embodiment, lighting device 40a), as described in FIG. 3. For example, when a lighting characteristic of lighting device 40b is to be controlled, first lighting device 40b is designated as the control target lighting device 40, and then the control is performed in accordance with the state of hand 110 and gesture involving hand 110.

Advantageous Effects, Etc.

There is a demand to be able to intuitively control a lighting characteristic of a desired lighting device by, for example, grabbing or touching the light output by the desired lighting device.

In light of this, lighting control device 10 includes sensor 20 that detects a state of user 100 and a gesture made by user 100, and controller 30 that controls a lighting characteristic of lighting device 40. Sensor 20 detects a first state and a second state of hand 110 of user 100. In response to sensor 20 detecting hand 110 in the first state aiming at one lighting device 40, controller 30 designates the one lighting device 40 as a control target lighting device 40. Then, controller 30 controls a lighting characteristic of the control target lighting device 40 in response to sensor 20 detecting a gesture involving hand 110 in the second state.

Moreover, lighting system 1 according to this embodiment includes lighting control device 10 and lighting device 40 that is controlled by lighting control device 10 and has a changeable lighting characteristic.

Moreover, a method of controlling a lighting device includes; detecting a first state and a second state of a hand of user 100; in response to detecting hand 110 of user 100 in the first state aiming at one lighting device 40 among one or more lighting devices 40, designating the one lighting device 40 as a control target lighting device 40; and in response to detecting a predetermined gesture involving hand 110 in the second state, changing a lighting characteristic of the control target lighting device 40.

With this, in response to user 100, for example, aiming hand 110 in the first state, which is an open hand state, at a lighting device 40 desired to be controlled, the lighting device 40 at which hand 110 is aiming is designated as a control target lighting device 40. Then, user 100 can change a lighting characteristic of the desired lighting device 40 by moving hand 110 in the second state, which is a closed fist state, aiming at the desired lighting device 40. Here, user 100 can change a lighting characteristic of lighting device 40 with a gesture that gives user 100 the sensation of, for example, grabbing or touching the light output by lighting device 40 by aiming hand 110 at lighting device 40 and moving hand 110. In this way, it is possible to change a lighting characteristic of a desired lighting device 40 via an intuitive gesture involving hand 110 of user 100 made with respect to the light output by lighting device 40.

Moreover, controller 30 controls the lighting characteristic of the control target lighting device 40 in response to sensor 20 detecting a gesture involving a change in distance between hand 110 in the second state and the control target lighting device 40.

This makes it possible to control, a lighting characteristic of lighting device 40 via a simple gesture involving hand 110 moving closer to or away from lighting device 40.

Moreover, controller 30 changes one of the brightness and color temperature of the control target lighting device 40 in response to sensor 20 detecting a gesture involving hand 110 in the second state.

In this way, it is possible to change, as the lighting characteristic, the brightness or color temperature of a desired lighting device 40 via an intuitive gesture involving hand 110 of user 100 made with respect to the light output by lighting device 40.

Moreover, controller 30 changes the brightness of the control target lighting device 40 in response to sensor 20 detecting one of a gesture involving hand 110 in the second state moving in a direction from user 100 toward the control target lighting device 40 and a gesture involving hand 110 in the second state moving in a direction from the control target lighting device 40 toward user 100.

This allows user 100 to change the brightness of lighting device 40 with a gesture that gives user 100 the sensation of pushing or pulling the light output by lighting device 40 toward or away from lighting device 40.

Moreover, controller 30 changes the color temperature of the control target lighting device 40 in response to sensor 20 detecting a gesture involving hand 110 in the second state moving in a direction substantially perpendicular to a direction from user 100 toward the control target lighting device 40.

This allows user 100 to change the color temperature of lighting device 40 with a gesture that gives user 100 the sensation of moving the light output by lighting device 40 in a vertical or horizontal direction in a view from user 100 toward lighting device 40.

Moreover, controller 30 stops changing one of the brightness and the color temperature of the control target lighting device 40 in response to sensor 20 detecting a gesture involving hand 110 changing from the second state to the first state.

This makes it possible to, after changing the brightness or color temperature of lighting device 40 via a gesture involving hand 110 in the second state, set the brightness or color temperature of lighting device 40 to the changed brightness or color temperature by changing hand 110 to the first state, which is different from the second state.

Moreover, controller 30 turns off the control target lighting device 40 in response to sensor 20 detecting a gesture involving hand 110 in the first state moving in a direction substantially perpendicular to a direction from user 100 toward the control target lighting device 40.

This allows user 100 to turn off lighting device 40 by, for example, making a gesture involving waving hand 110 so as to say "goodbye" to lighting device 40a.

Moreover, sensor 20 detects an open hand as the first state of hand 110 and detects a closed fist the second state of hand 110.

This makes it possible to control a lighting characteristic of lighting device 40 via, a simple gesture involving hand 110 changing to an open hand or a close fist. Moreover, closing hand 110 into a fist as the second state gives user 100 the sensation of grabbing the light.

Moreover, controller 30 turns off the one or more lighting devices 40 when sensor 20 does not detect user 100 in a given range.

This makes it possible to automatically turn off lighting device 40, without requiring user 100 to manually turn off lighting device 40, when user 100 moves out of the given range.

Moreover, sensor 20 includes a camera. The camera is an infrared camera.

This makes it possible for sensor 20 to easily detect a state of and a gesture made by user 100.

Other Embodiments

Lighting control device 10 and lighting system 1 have hereinbefore been described according to an exemplary embodiment, but the techniques of the present disclosure are not limited to this embodiment.

For example, in the above embodiment, lighting control device 10 is exemplified as including sensor 20 and controller 30 as a single unit, but this example is not limiting. For example, lighting control device 10 may include sensor 20 and controller 30 as separate units. In this case, controller 30 may be, for example, a personal computer (PC), and may communicate with sensor 20 over a wired or wireless connection.

Moreover, for example, in the above embodiment, controller 80 is exemplified as controlling a single lighting device 40a, but this example is not limiting. For example, controller 30 may control a plurality of lighting devices 40 as a group. For example, controller 30 may control lighting devices 40a through 40c as a group and, alternatively, may control lighting device 40a and lighting device 40b as a group.

In this case, sensor 20 further detects a third state of hand 110. Controller 30 switches between controlling one of the plurality of lighting devices 40 and two or more of the plurality of lighting devices 40 as a group in response to sensor 20 detecting hand 110 in the third state. When two or more of the plurality of lighting devices 40 are to be controlled as a group, controller 30 controls the two or more of the plurality of lighting devices 40 as a group in response to sensor 20 detecting a gesture involving a change in distance between hand 110 in the second state and sensor 20. This will be explained in more detail hereinafter.

The third state may be any state different from the first state and the second state. For example, the third state may be a state in which hand 110 is in a closed fist state with two fingers extended out (in other words, a state in which hand 110 is formed as the "scissors" hand in the "rock-paper-scissors" game.) Each time sensor 20 detects hand 110 in the third state, controller 30 switches between a mode for controlling a single lighting device 40 and a mode for controlling a plurality of lighting devices 40 as a group. In the mode for controlling a plurality of lighting devices 40 as a group, user 100 first aims hand 110 in the first state (for example, an open hand state) at the lighting devices 40 desired to be controlled. For example, when designating lighting device 40a and lighting device 40b as control target lighting devices 40, user 100 aims hand 110 in an open hand state at lighting device 40a, and then aims hand 110 in an open hand state at lighting device 40b. Note that user 100 may first aim hand 110 in an open hand state at lighting device 40b then subsequently at lighting device 40a. Then, user 100 can move hand 110 in the second state (for example, in a closed fist state) so as to change the distance from sensor 20 to control a lighting characteristic of both lighting device 40a and lighting device 40b as a group. For example, user 100 can change the brightness of lighting device 40a and lighting device 40b by moving hand 110 in a closed hand state in a direction from user 100 toward sensor 20 or in a direction from sensor 20 toward user 100. Moreover, for example, user 100 can change the color temperature of lighting device 40a and lighting device 40b by moving hand 110 in a closed hand state in a direction substantially perpendicular to a direction from user 100 toward sensor 20.

Moreover, for example, in the above embodiment, lighting system 1 is exemplified as including a single lighting control device 10, but this example is not limiting. For example, lighting system 1 may include a plurality of lighting control devices 10. For example, lighting system 1 may include a first lighting control device, a second lighting control device, a first lighting device group including one or more lighting devices, and a second lighting device group including one or more lighting devices. In this case, for example, the first lighting control device may control the first lighting device group, and the second lighting control device may control the second lighting device group.

Moreover, for example, in the above embodiment, the first state is hand 110 in an open hand state, but the first state is not limited to this example. For example, the first state may be a state in which 1, 2, 3, or 4 fingers of hand 110 in a closed fist state are extended, and may be a state in which, for example, hand 110 is closed into a fist.

Moreover, for example, in the above embodiment, the second state is hand 110 in a closed fist state, but the second state is not limited to this example. For example, the second state may be a state in which 1, 2, 3, or 4 fingers of hand 110 in a closed fist state are extended, and may be a state in which the palm of hand 110 is open.

Moreover, for example, in the above embodiment, a gesture involving movement in a direction substantially perpendicular to a direction from user 100 toward the control target lighting device 40 is a gesture involving movement side-to-side direction from the perspective of user 100 looking at the control target lighting device 40, but this example is not limiting. For example, a gesture involving movement in a direction substantially perpendicular to a direction from user 100 toward the control target lighting device 40 may be a gesture involving movement in a vertical direction from the perspective of user 100 looking at the control target lighting device 40.

Moreover, for example, in the above embodiment, the brightness of the control target lighting device 40 is changed in accordance with a gesture involving movement in a direction from user 100 toward the control target lighting device 40 or a gesture involving movement in a direction from the control target lighting device 40 toward user 100, and the color temperature of the control target lighting device 40 is changed in accordance with a gesture involving movement in a direction substantially perpendicular to a direction from user 100 toward the control target lighting device 40, but these examples are not limiting. For example, the color temperature of the control target lighting device 40 may be changed in accordance with a gesture involving movement in a direction from user 100 toward the control target lighting device 40 or a gesture involving movement s direction from the control target lighting device 40 toward user 100, and the brightness of the control target lighting device 40 may be changed in accordance with a gesture involving movement in a direction substantially perpendicular to a direction from user 100 toward the control target lighting device 40.

Moreover, for example, in the above embodiment, the brightness and color temperature are controlled as lighting characteristics of lighting device 40, but these examples are not limiting. For example, the size or position, etc., of the projection region may be controlled as a lighting characteristic of lighting device 40.

General or specific aspects of the present disclosure may be realized as a system, method, integrated circuit, computer program, computer readable medium such as a CD-ROM, or any given combination thereof.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control device, comprising:
a sensor that detects a state of a user and a gesture made by the user; and
a controller that controls a lighting characteristic of one or more lighting devices, wherein:
the sensor detects a first state and a second state of a hand of the user,
in response to the sensor detecting the hand of the user in the first state aiming at one lighting device among the one or more lighting devices, the controller designates the one lighting device as a control target lighting device,
in response to the sensor detecting a predetermined gesture involving the hand in the second state, the controller controls a lighting characteristic of the control target lighting device,
the one or more lighting devices comprise a plurality of lighting devices,
the sensor further detects a third state of the hand,
the controller switches between controlling one of the plurality of lighting devices and controlling two or more of the plurality of lighting devices as a group in response to the sensor detecting the hand in the third state.

2. The lighting control device according to claim 1, wherein the controller controls the lighting characteristic of the control target lighting device in response to the sensor detecting a gesture involving a change in distance between the hand in the second state and the control target lighting device.

3. The lighting control device according to claim 1, wherein the controller changes one of a brightness and a color temperature of the control target lighting device in response to the sensor detecting the predetermined gesture involving the hand in the second state.

4. The lighting control device according to claim 3, wherein the controller changes the brightness of the control target lighting device in response to the sensor detecting one of a gesture involving the hand in the second state moving in a direction from the user toward the control target lighting device and a gesture involving the hand in the second state moving in a direction from the control target lighting device toward the user.

5. The lighting control device according to claim 3, wherein the controller changes the color temperature of the control target lighting device in response to the sensor detecting a gesture involving the hand in the second state moving in a direction substantially perpendicular to a direction from the user toward the control target lighting device.

6. The lighting control device according to claim 3, wherein the controller stops changing the one of the brightness and the color temperature of the control target lighting device in response to the sensor detecting a gesture involving the hand changing from the second state to the first state.

7. The lighting control device according to claim 1, wherein the controller turns off the control target lighting device in response to the sensor detecting a gesture involving the hand in the first state moving in a direction substantially perpendicular to a direction from the user toward the control target lighting device.

8. The lighting control device according to claim 1, wherein the sensor detects an open hand as the first state and detects a closed first as the second state.

9. The lighting control device according to claim 1, wherein the controller turns off the one or more lighting devices when the sensor does not detect the user in a given range.

10. The lighting control device according to claim 1, wherein
when the two or more of the plurality of lighting devices are to be controlled as a group, the controller controls the two or more of the plurality of lighting devices as a group in response to the sensor detecting a gesture involving a change in distance between the hand in the second state and the sensor.

11. The lighting control device according to claim 1, wherein the sensor includes a camera.

12. The lighting control device according to claim 11, wherein the camera is an infrared camera.

13. A lighting system, comprising:
the lighting control device according to claim 1; and
the one or more lighting devices that are controlled by the lighting control device and have a changeable lighting characteristic.

14. A method of controlling a lighting device, comprising:
detecting a first state and a second state of a hand of the user;
in response to detecting the hand of the user in the first state aiming at one lighting device among one or more lighting devices, designating the one lighting device as a control target lighting device; and
in response to detecting a predetermined gesture involving the hand in the second state, controlling a lighting characteristic of the control target lighting device, wherein:
the one or more lighting devices comprise a plurality of lighting devices, and
the method further comprises:
detecting a third state of the hand, and
switching between controlling one of the plurality of lighting devices and controlling two or more of the plurality of lighting devices as a group in response to detection of the hand in the third state.

* * * * *